United States Patent
Tani (10) Patent No.: US 10,014,729 B2
(45) Date of Patent: Jul. 3, 2018

(54) WIRELESS POWER SUPPLY METHOD

(71) Applicant: Panasonic Intellectual Property Management Co., Ltd., Osaka (JP)

(72) Inventor: Hiroyuki Tani, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 267 days.

(21) Appl. No.: 15/066,638

(22) Filed: Mar. 10, 2016

(65) Prior Publication Data

US 2016/0294196 A1 Oct. 6, 2016

(30) Foreign Application Priority Data

Apr. 2, 2015 (JP) ................. 2015-076191

(51) Int. Cl.
| | |
|---|---|
| H01F 27/42 | (2006.01) |
| H01F 37/00 | (2006.01) |
| H01F 38/00 | (2006.01) |
| H02J 50/20 | (2016.01) |
| H02J 50/90 | (2016.01) |
| H01Q 3/08 | (2006.01) |
| H01Q 21/06 | (2006.01) |

(52) U.S. Cl.
CPC ............. *H02J 50/20* (2016.02); *H01Q 3/08* (2013.01); *H01Q 21/061* (2013.01); *H02J 50/90* (2016.02)

(58) Field of Classification Search
CPC . H02J 5/005; H02J 7/025; H02J 17/00; H01F 38/14; B60L 11/182

USPC .......................................................... 307/104
See application file for complete search history.

(56) References Cited

U.S. PATENT DOCUMENTS

| | | | |
|---|---|---|---|
| 4,418,350 A | 11/1983 | Rosen | |
| 4,779,097 A * | 10/1988 | Morchin ................. | H01Q 3/01 342/157 |
| 8,835,823 B2 * | 9/2014 | Hyde ...................... | H02J 17/00 250/201.1 |
| 2009/0295640 A1 | 12/2009 | Shimizu | |
| 2010/0033021 A1 * | 2/2010 | Bennett .................. | H02J 17/00 307/104 |
| 2010/0315045 A1 * | 12/2010 | Zeine ..................... | H02J 7/025 320/137 |
| 2014/0159954 A1 | 6/2014 | Stoddard | |
| 2015/0022009 A1 * | 1/2015 | Leabman ............... | H02J 7/025 307/104 |
| 2015/0330851 A1 * | 11/2015 | Beligere ................ | G01L 3/108 73/862.338 |
| 2016/0082848 A1 | 3/2016 | Ichikawa et al. | |
| 2017/0237278 A1 * | 8/2017 | Zhang ................... | H02J 7/025 320/108 |

FOREIGN PATENT DOCUMENTS

| | | |
|---|---|---|
| JP | 7-236204 A | 9/1995 |
| JP | 2004-088443 | 3/2004 |
| JP | 2008-092703 | 4/2008 |

(Continued)

*Primary Examiner* — Quan Tra (74) *Attorney, Agent, or Firm* — Panasonic IP Management; Kerry S. Culpepper (57) ABSTRACT

A rotational deviation and a positional deviation of a power transmission antenna and a power reception antenna are adjusted using an amount of electric power received in adjustment antenna elements provided on the same plane as the power transmission antenna and the power reception antenna.

3 Claims, 10 Drawing Sheets

(56) References Cited

FOREIGN PATENT DOCUMENTS

| | | |
|---|---|---|
| JP | 2010-154146 | 7/2010 |
| JP | 2013-236524 | 11/2013 |
| JP | 2014-217213 A | 11/2014 |
| WO | 2012/111155 | 8/2012 |

\* cited by examiner

WIRELESS POWER SUPPLY METHOD

BACKGROUND OF THE INVENTION

1. Field of the Invention

The present invention relates to a wireless power supply method for supplying electric power wirelessly by electromagnetic waves (microwaves).

2. Description of the Related Art

In recent years, a technology that supplies the electric power by electromagnetic waves and supplies the electric power wirelessly has been developed. As an example of a wireless power supply technology by the electromagnetic waves, there is a method that uses the binding or resonance of the magnetic field in a short distance equal to or less than several meters, such as electromagnetic induction or magnetic resonance using the electromagnetic waves with a frequency bandwidth from several 100 KHz to several MHz.

In addition, there is a system that uses the microwave as a wireless power transmission method in a case where the distance from a power transmission device to a power reception device is long. It is possible to transmit the electric power to a remote power reception device by using a microwave beam from several 100 MHz to several GHz. As an example of such a wireless power transmission system, there is a space solar power generation system in which a satellite on which solar panels are mounted is launched above the equator, and the electric power generated by solar light is transmitted to the power reception device on the ground. In addition, there is a system or the like that transmits the electric power to a power reception device installed on a remote island.

There are fewer restrictions on a transmission distance in a power transmission method by the microwave compared to other methods. Therefore, a system for supplying power to an object that moves (moving object), such as an electric car and a robot has been proposed.

However, in the power supply system, a relative position is changed between the power transmission device and the power reception device according to the movement of the moving object that is a power supply target. Therefore, there is a problem that a microwave beam generated from the power transmission device cannot be properly transmitted to the power reception device of the moving object. Accordingly, there are problems of fluctuation of power transmission efficiency of the power supply system, safety on the electromagnetic waves that leak to an outside of the power supply system, influence of the leaking electromagnetic waves on other equipment, or interference of the leaking electromagnetic waves with other electric waves.

For such problems, a technique that transmits a microwave beam accurately and efficiently to power reception devices without leaking of the microwave beam to the outside is required. As such techniques, a method (Japanese Patent Unexamined Publication No. 2013-236524) of inducing the moving object to a power supply position by recognizing a position of the moving object being at a power reception side is known. In addition, a method (Japanese Patent Unexamined Publication No. 2008-92703) of realizing power transmission according to a position of a power reception antenna by mechanically controlling a device of the power transmission side is known.

Figure 11:
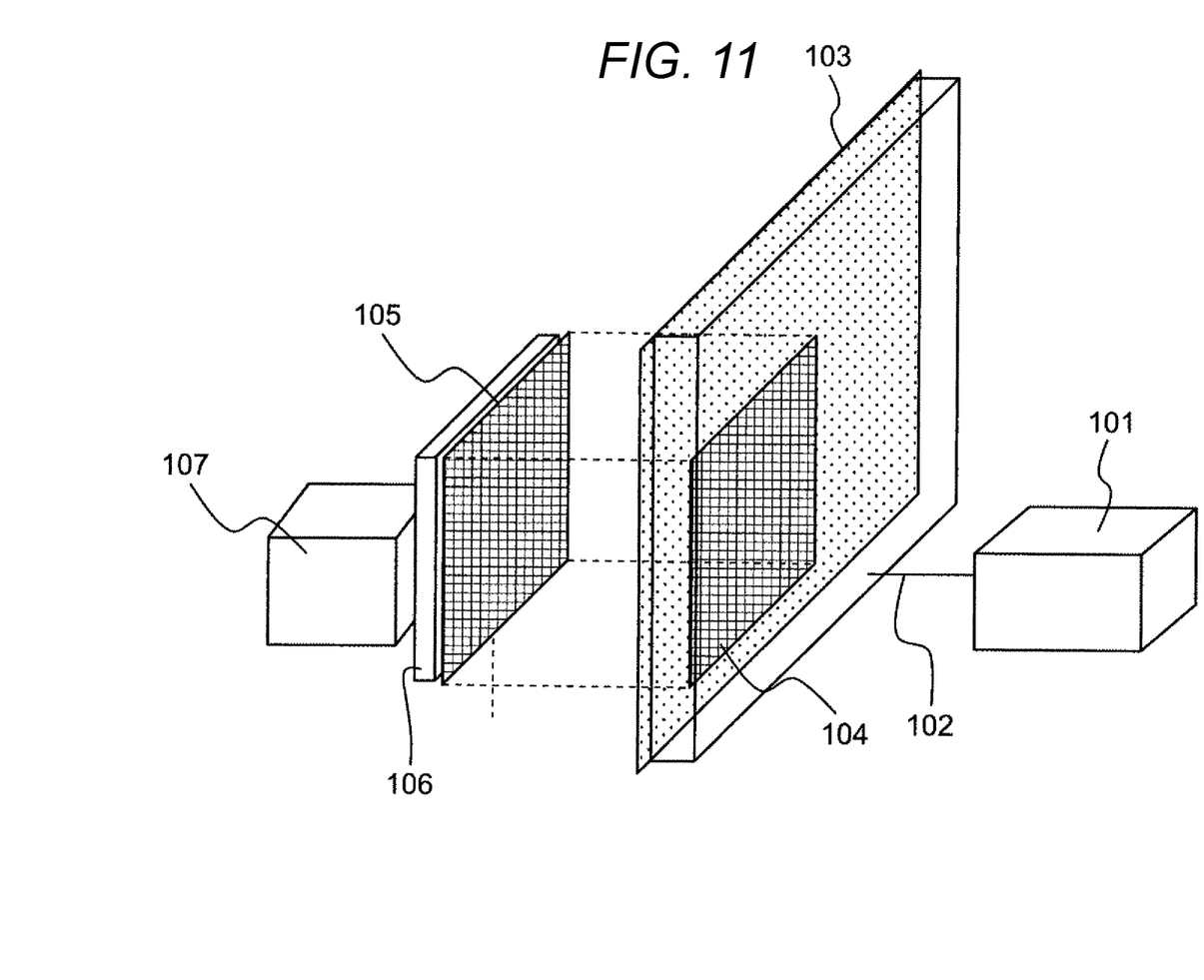
FIG. 11 is a diagram illustrating a wireless power supply method of the related art.

FIG. 11 is a diagram illustrating an example of a configuration of a power transmission system of the related art. Microwaves are supplied to power transmission antenna 103 through microwave transmission passage 102 from microwave generator 101. Microwave transmission passage 102 includes a distributor and an amplifier in some cases. Power transmission antenna 103 has a power transmission surface with a large size which can accommodate a movement range (position deviation range) of power reception antenna 105. In the power transmission surface, only a portion corresponding to a power reception surface of power reception antenna 105 is opening portion 104 of the power transmission antenna. The electromagnetic waves are radiated from opening portion 104, and the electromagnetic waves are not radiated from a portion other than opening portion 104. With this, efficient microwave transmission is realized. The electromagnetic waves received at power reception antenna 105 is properly converted into the electric power in power conversion circuit 106, and then the electric power is supplied to power supply target 107.

SUMMARY OF THE INVENTION

In the power transmission method of the related art, it is necessary for a configuration to recognize power transmission positions. In addition, the power transmission method of the related art requires a large antenna which can accommodate positional deviation of the power reception antenna. Therefore, the power transmission method of the related art needs a large and complicated configuration, which is not a practical configuration, in addition to basic functions of power transmission and power reception.

A wireless power supply method according to the present disclosure eliminates problems in the power transmission method of the related art, and solves problems of efficiency degradation or the leakage of the electromagnetic waves due to the positional deviation. In addition, in the wireless power supply method according to the present disclosure, it is possible to realize rotation adjustment and position adjustment of the power transmission antenna and the power reception antenna by using constituent elements of the power transmission antenna and the power reception antenna, and without using a separate dedicated system for the positioning of the power supply target.

In order to solve the problems, according to the present disclosure, there is provided a wireless power supply method for transmitting electric power by microwaves between a power transmission antenna and a power reception antenna configured by arranging a plurality of antenna elements on a plane, the method including receiving a microwave beam that is radiated from the power transmission antenna by a plurality of adjustment antenna elements arranged at equal distances from the center of the power reception antenna on the same plane as the power reception antenna, and adjusting a rotational deviation and a positional deviation of the power transmission antenna and the power reception antenna based on an amount of the received electric power.

As described above, according to the wireless power supply method of an aspect of the present disclosure, since the rotation adjustment and the position adjustment are performed based on the amount of electric power by using the microwave beam used in actual electric power transmission, it is possible to realize safe wireless power supply of the electric power with a high degree of accuracy and with low leakage.

DETAILED DESCRIPTION OF THE PREFERRED EMBODIMENT

Hereinafter, an embodiment of the present disclosure will be described with reference to the drawings.

Figure 1:
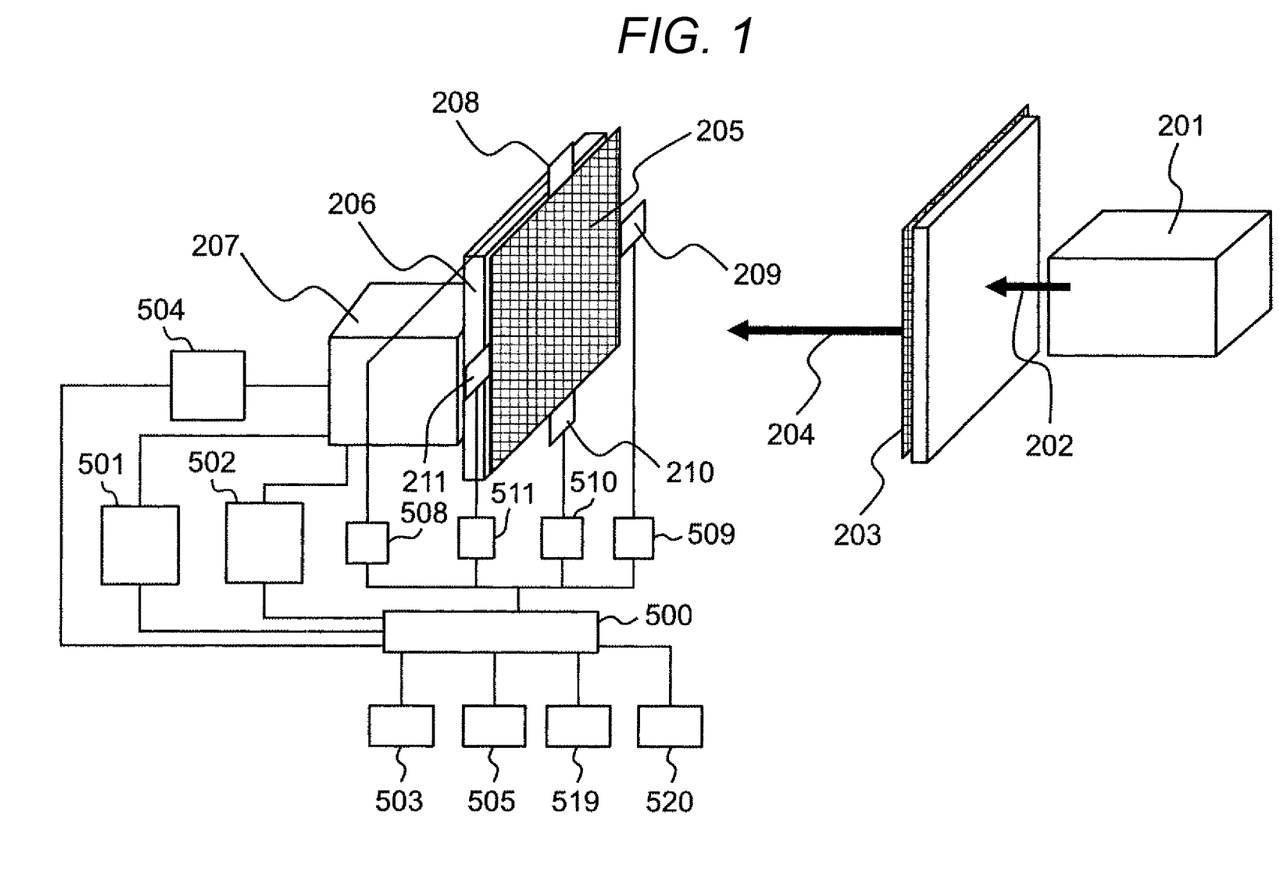
FIG. 1 is a diagram illustrating a wireless power supply method according to an embodiment of the invention.

FIG. 1 is a diagram illustrating a wireless power supply method according to the present embodiment and a wireless power supply apparatus for implementing the wireless power supply method.

Wireless power supply is performed by transmitting the electric power by microwave beam 204 between power transmission antenna 203 and power reception antenna 205 constituted by arranging a plurality of antenna elements on a plane. More specifically, wireless power supply is performed as follows.

First, the electric power is supplied to power transmission antenna 203 through microwave transmission passage 202 (including a distributor, and a phaser and an amplifier in some cases) from microwave generator 201. Power transmission antenna 203 radiates microwave beam 204 which is combined by a plurality of antennas. Radiated microwave beam 204 is received by power reception antenna 205. Received microwave beam 204 is appropriately converted into the DC power in power conversion circuit 206. The supply of the electric power to power supply target 207 is performed by using the DC power.

Here, in the present embodiment, before performing the supply of the electric power, microwave beam 204 radiated from power transmission antenna 203 is received by four adjustment antenna elements 208, 209, 210, and 211 provided on the same plane as power reception antenna 205. The positional deviation and the rotational deviation of power transmission antenna 203 and power reception antenna 205 are detected and adjusted based on the amount of received electric power, respectively.

Figure 2:
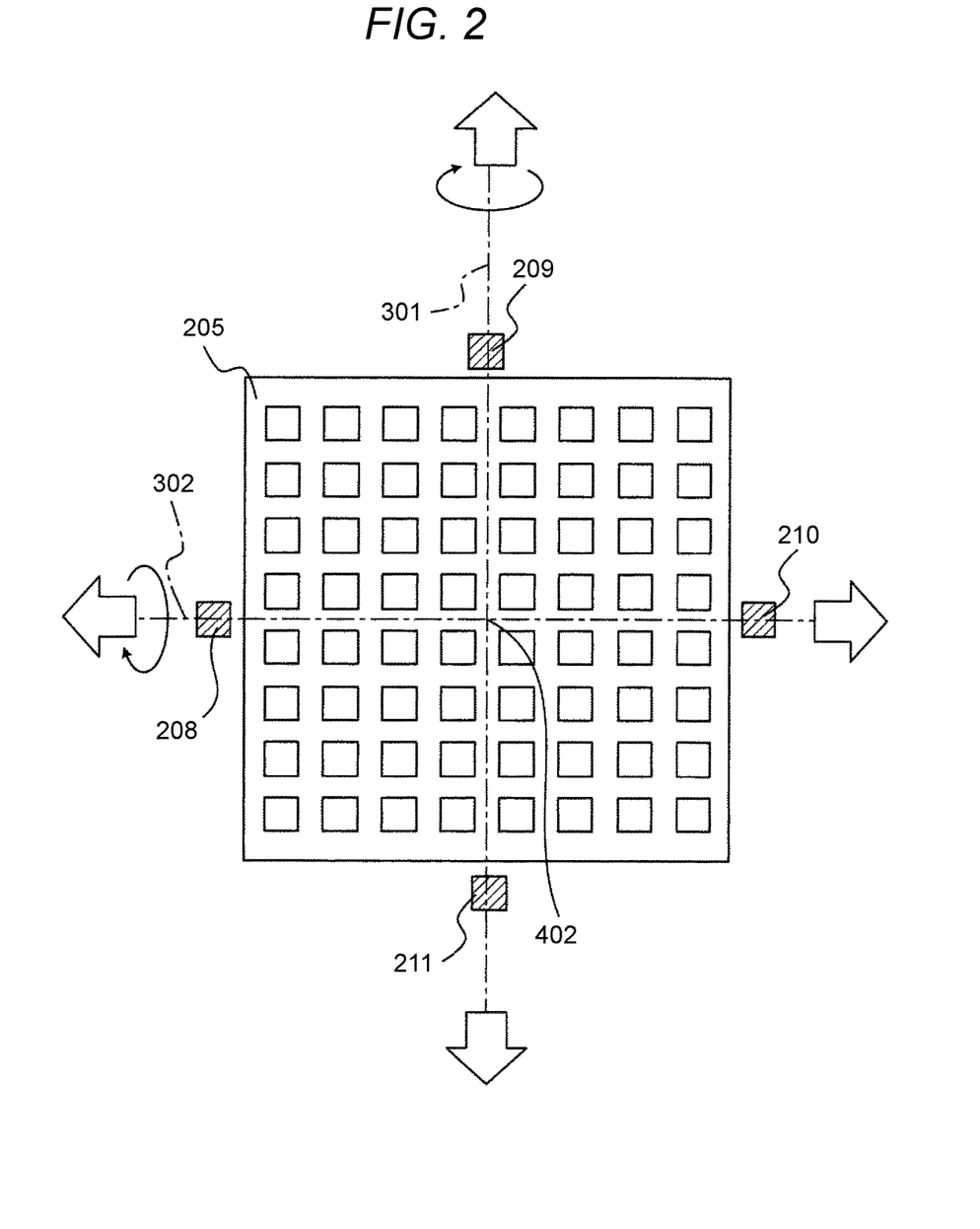
FIG. 2 is a diagram illustrating an arrangement of adjustment antenna elements used in the wireless power supply method.

An example of an arrangement of adjustment antenna elements 208, 209, 210, and 211 is illustrated in FIG. 2. Axis 301 and axis 302 are on the same plane as power reception antenna 205. Therefore, axis 301 and axis 302 are orthogonal to each other at position 402 of the center of power reception antenna 205. Power reception antenna 205 is rotated around axis 301 and axis 302 as the rotation axes, moved in parallel along axis 301 and axis 302, and moved vertically with respect to a power reception surface of power reception antenna 205.

Adjustment antenna element 208 and adjustment antenna element 210 are in symmetrical and equidistant positions on axis 302 from position 402 at the center of power reception antenna 205. Adjustment antenna element 209 and adjustment antenna element 211 are in symmetrical and equidistant positions on axis 301 from position 402 of the center of power reception antenna 205. Adjustment antenna element 208 and adjustment antenna element 210 arranged on the same axis 302 have the same shape and the same configuration. In addition, adjustment antenna element 209 and adjustment antenna element 211 arranged on the same axis 301 have the same shape and the same configuration. As an example, in this embodiment, power reception antenna 205, four adjustment antenna elements 208, 209, 210, and 211, and power transmission antenna 203 are configured as rectangular shapes.

Movement mechanism 501 can linearly move power reception antenna 205 along axis 301 and along axis 302. In addition, vertical direction movement mechanism 504 can move power reception antenna 205 with respect to an antenna surface of power reception antenna 205 in a vertical direction. In addition, rotation mechanism 502 can rotate power reception antenna 205 around axis 301 and around axis 302.

Each of movement mechanism 501 and vertical direction movement mechanism 504 can be configured with a driving device of power supply target 207, as an example.

In addition, each of movement mechanism 501 and vertical direction movement mechanism 504 can be independently configured with a driving device of power supply target 207, as another example.

Rotation mechanism 502 can be configured with a driving device of power supply target 207, as an example. In addition, rotation mechanism 502 can be configured separately from the driving device of power supply target 207, as another example.

Here, a relationship between a position of radiated microwave beam 204 and a distribution of received electric power on power reception antenna 205 will be described by using FIG. 3 and FIG. 4. The horizontal axis represents a position of microwave beam 204 radiated on a surface of the power reception antenna, and the vertical axis represents the amount of electric power received in each position. Here, a position of the center of power reception antenna 205 is 402. In addition, positions of adjustment antenna elements 208 and 210 are 405 and 406, respectively. Positions of adjustment antenna elements 209 and 211 are 405 and 406, respectively. Positions 405 and 406 of adjustment antenna elements 208 and 210 or 209 and 211 have a position relationship where positions are at symmetrically equal distances from position 402 of the center of power reception antenna 205. In addition, a point of the largest amount of electric power is position 401 of the center of the microwave beam in an electric power distribution on power reception antenna 205 in a certain state.

Figure 3:
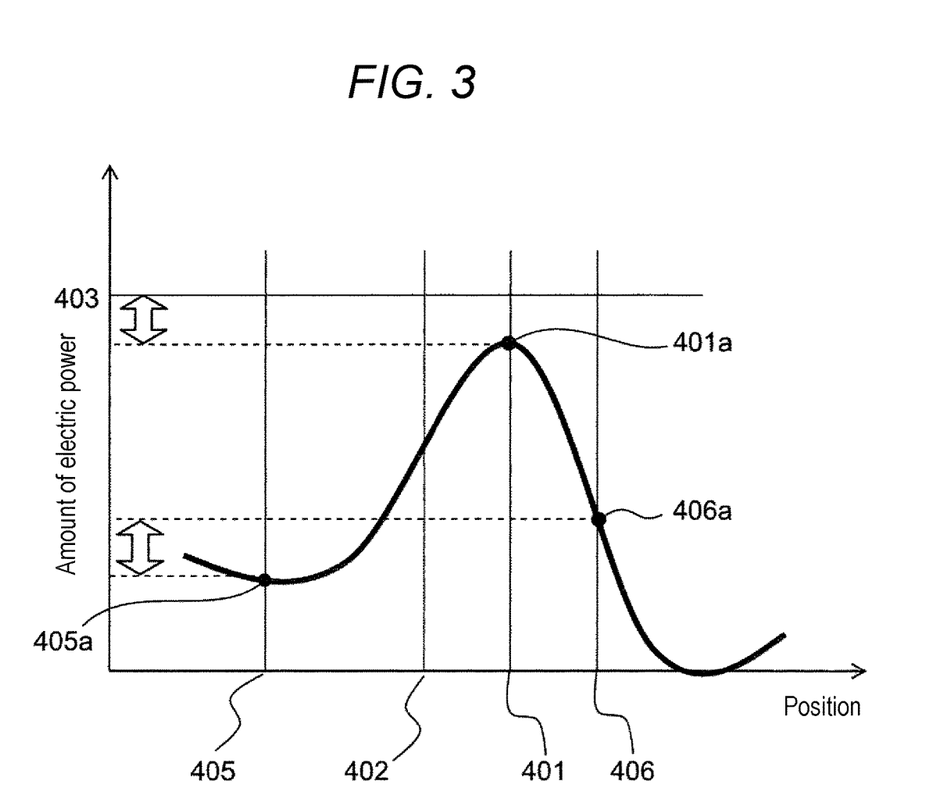
FIG. 3 is a diagram illustrating an electric power distribution on a power reception antenna before adjustment.

FIG. 3 illustrates a received electric power distribution on power reception antenna 205 in a state where a position and an angle of power reception antenna 205 deviate from power transmission antenna 203. In this state, amounts of electric power 405a and 406a in positions 405 and 406 of adjustment antenna elements 208 and 210 or 209 and 211 are not matched with each other. At the same time, position 401 of the center of microwave beam 204 does not match with position 402 of the center of power reception antenna 205, and amount of electric power 401a thereof becomes a smaller value than amount of electric power 403 that is desired.

Figure 4:
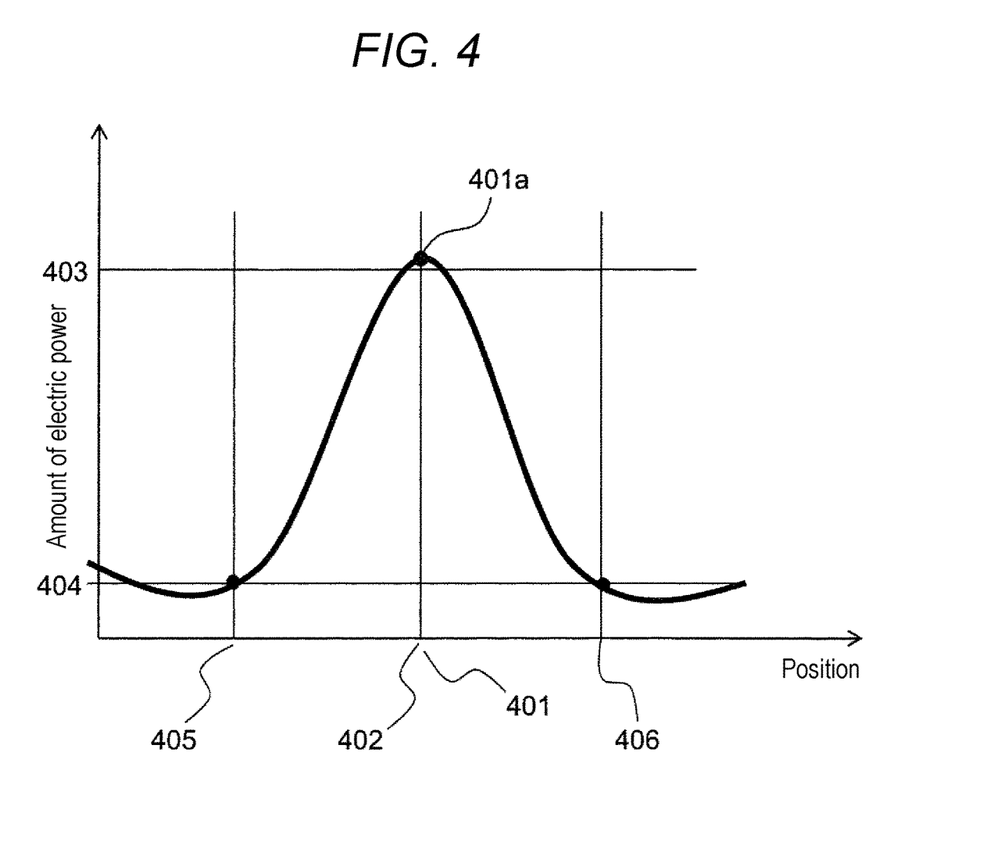
FIG. 4 is a diagram illustrating an electric power distribution on the power reception antenna after adjustment.

Meanwhile, FIG. 4 illustrates an electric power distribution in a state where a position and an angle of power reception antenna 205 are adjusted with respect to power transmission antenna 203. In this state, the amount of electric power in positions 405 and 406 of adjustment antenna elements 208 and 210 or 209 and 211 are matched in a value illustrated as 404. At the same time, position 401 of the center of microwave beam matches with position 402 of the center of power reception antenna 205, and amount of electric power 401a thereof becomes a greater value than amount of electric power 403 that is desired. This state is a state where position and rotation adjustments of power transmission antenna 203 and power reception antenna 205 are completed.

Accordingly, in this embodiment, a rotation operation and a position moving operation are performed by movement mechanism 501, vertical direction movement mechanism 504, and rotation mechanism 502 in a state (that is, a state where the amount of electric power in positions 405 and 406 of adjustment antenna elements 208 and 210 or 209 and 211 are not matched with each other) where a position and an angle deviate as illustrated in FIG. 3. Then, position and rotation adjustments of power transmission antenna 203 and power reception antenna 205 are performed by performing the adjustment to a state where values of the amount of electric power in positions 405 and 406 of adjustment antenna elements 208 and 210 or 209 and 211 as described in FIG. 4 are matched in amount of electric power 404.

A device for adjusting the rotation and the position is configured with power meters 508, 509, 510, and 511, storage 520, searcher 519, calculator 505, determinator 503, control device 500, movement mechanism 501, vertical direction movement mechanism 504, and rotation mechanism 502.

Power meters 508, 509, 510, and 511 measure the electric power of adjustment antenna elements 208, 209, 210, and 211, respectively.

Control device 500 is connected to power meters 508, 509, 510, and 511, storage 520, searcher 519, calculator 505, determinator 503, movement mechanism 501, vertical direction movement mechanism 504, and rotation mechanism 502. Accordingly, a search operation by searcher 519 or a calculation operation by calculator 505, and a determination operation by determinator 503 are performed based on the amount of electric power detected in power meters 508, 509, 510, and 511. Movement mechanism 501, vertical direction movement mechanism 504, and rotation mechanism 502 are independently controlled to be driven.

Figure 5:
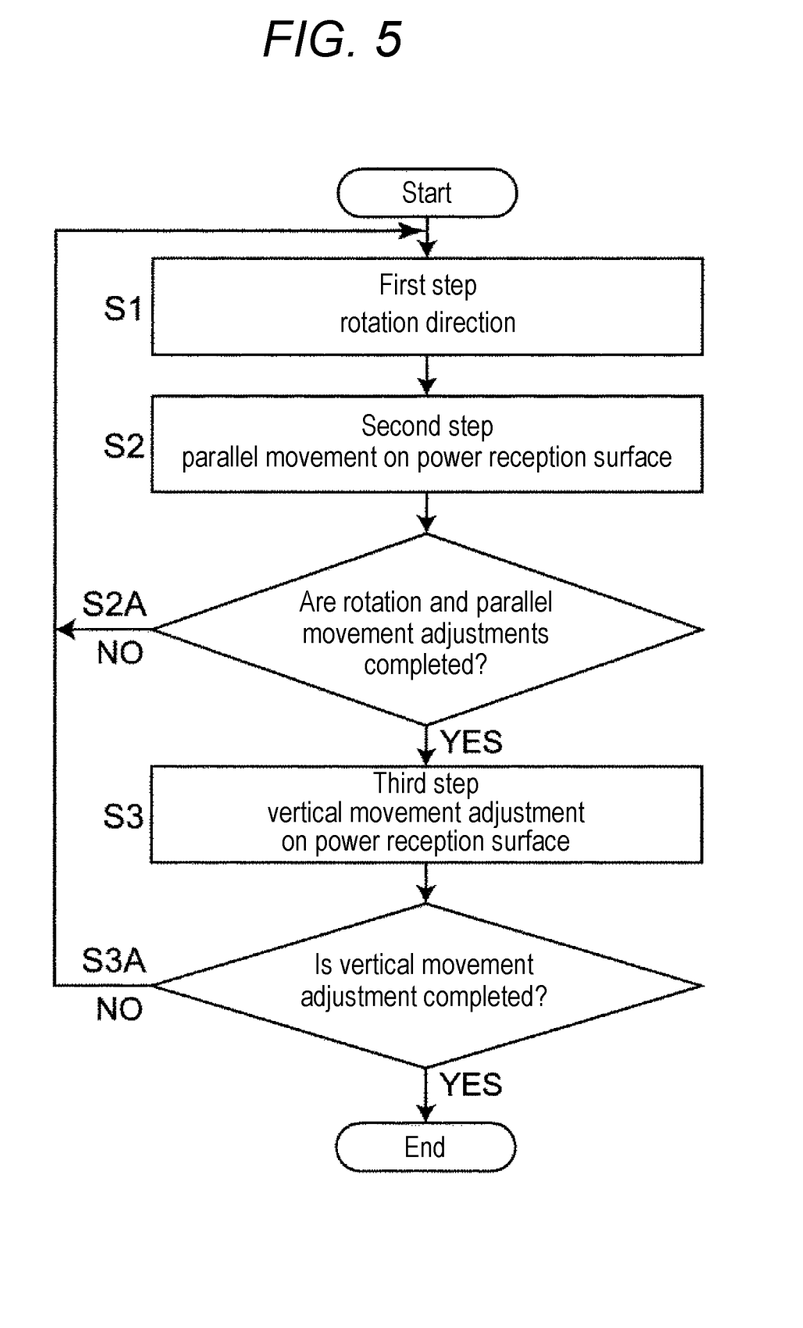
FIG. 5 is a flow chart illustrating an adjustment method used in the wireless power supply method.
Figure 6:
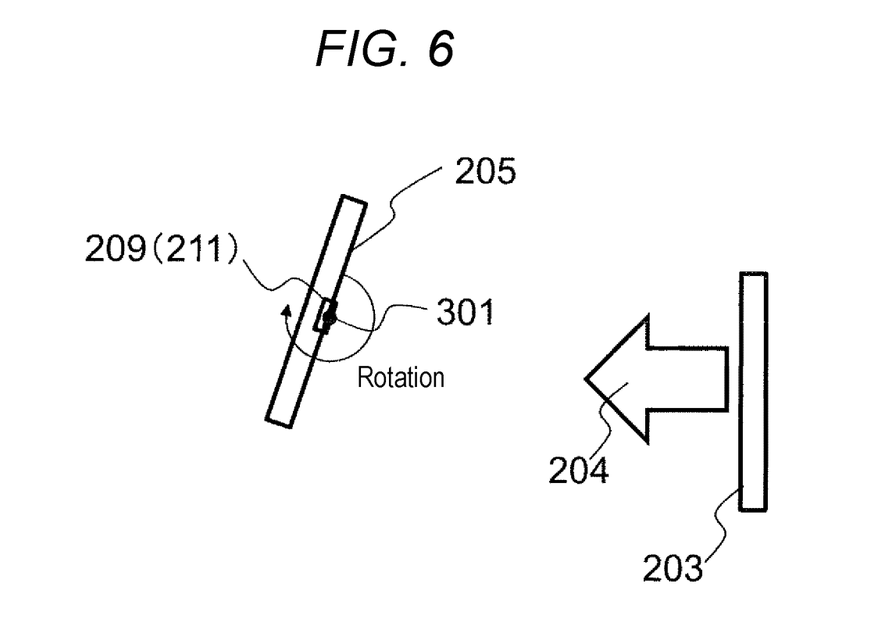
FIG. 6 is a diagram illustrating rotation direction adjustment used in the wireless power supply method.

A flow chart of a method for adjusting the rotation and the position of power reception antenna 205 illustrated in FIG. 2 will be illustrated in FIG. 5, and respective steps will be described using FIG. 6, FIG. 7, and FIG. 8. Adjustment operations are performed under the control operation of control device 500.

A basic flow of adjustment is configured with first step S1 in which adjustment is performed in a rotation direction, second step S2 in which parallel movement adjustment with respect to the power reception surface is performed, and third step S3 in which vertical movement adjustment with respect to the power reception surface is performed. The amount of electric power received in adjustment antenna element 208 is P208. The amount of electric power received in adjustment antenna element 209 is P209. The amount of electric power received in adjustment antenna element 210 is P210. The amount of electric power received in adjustment antenna element 211 is P211. It is assumed to perform respective adjustments on rotation and parallel movement while detecting values of amounts of electric power P208, P209, P210, and P211 by power meters 508, 509, 510, and 511, respectively.

First, as first step S1, adjustment in a rotation direction is performed. The amount of electric power received by the adjustment antenna element arranged on the rotation axis on which rotation adjustment is performed is used in the adjustment. With this, it is possible for the effect of distance variation caused by the rotation operation to be ignored and to search for an angle at which electric power can be most efficiently received by changing only the angle without changing the distance between power transmission antenna 203 and the adjustment antenna element during the rotation operation.

A case where rotation is performed with axis 301 as a rotation axis in FIG. 6 will be described, as an example. Rotation adjustment on power reception antenna 205 is performed by rotation mechanism 502 around axis 301 up to an angle where the value of amount of electric power P209, or amount of electric power P211, is maximized. A method for determining the angle where the value of amount of electric power P209, or amount of electric power P211, is maximized will be described below.

A value of amount of electric power P209, or a value of amount of electric power P211, is detected while rotation is performed with axis 301 as a rotation axis by rotation mechanism 502 from a current initial angle up to a constant angle, for example, up to 90° in a forward direction or in a reverse direction. Accordingly, values of amounts of electric power in respective angles are stored in storage 520 through control device 500. Next, under the control of control device 500, the maximum value is found by searcher 519 from values of amounts of electric power stored in storage 520, and power reception antenna 205 is rotated around axis 301 by rotation mechanism 502 up to an angle corresponding to the maximum value that is found by searcher 519.

Next, a value of amount of electric power P208 or a value of amount of electric power P210 is detected around axis 302 as a rotation axis, and the amounts of electric power in respective angles are stored in storage 520 through control device 500. Then, under the control of control device 500, the maximum value is found by searcher 519 from values of the amounts of electric power stored in storage 520, and power reception antenna 205 is rotated around axis 302 by rotation mechanism 502 up to an angle corresponding to the maximum value that is found by searcher 519.

In this manner, the angle of power reception antenna 205 is adjusted.

In addition, an order of performing the rotation around axis 301 and the rotation around axis 302 may be arbitrary. In a step of the rotation adjustment, rotation angles before the adjustment and after the adjustment are stored in storage 520.

Next, as second step S2, parallel movement adjustment on the power reception surface of power reception antenna 205 will be described. The adjustment is a method that receives the microwave in adjustment antenna elements 208, 209, 210, and 211, detects the amount of electric power thereof, and performs movement adjustment until there is no difference of the electric power. In fact, a threshold considered that there is no difference of electric power is provided, and the movement adjustment of power reception antennas 205 is performed by movement mechanism 501 until the difference of the electric power reaches the threshold.

Figure 7:
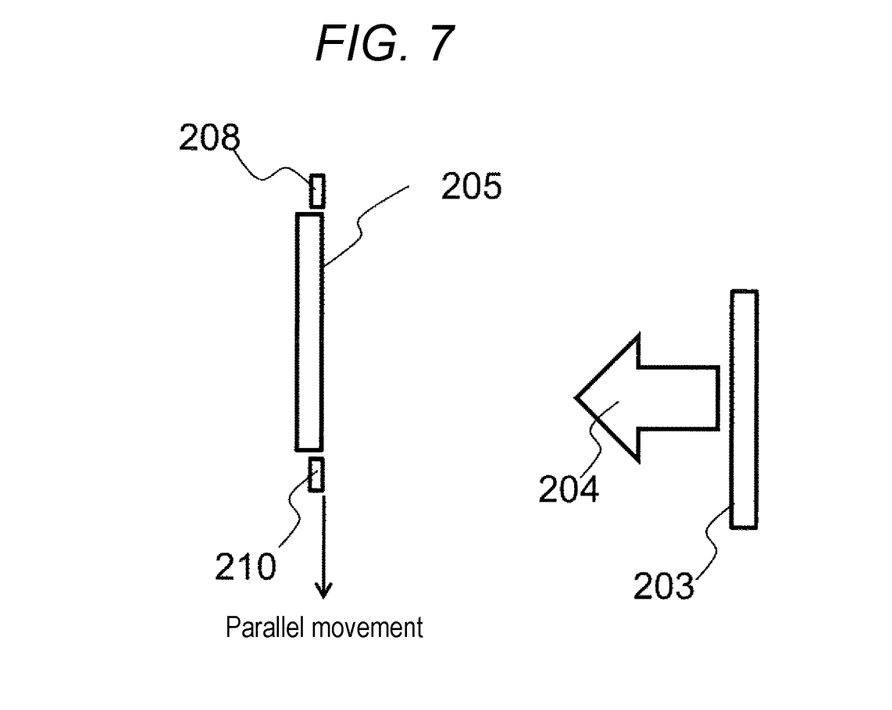
FIG. 7 is a diagram illustrating parallel movement adjustment on a power reception surface used in the wireless power supply method.
Figure 8:
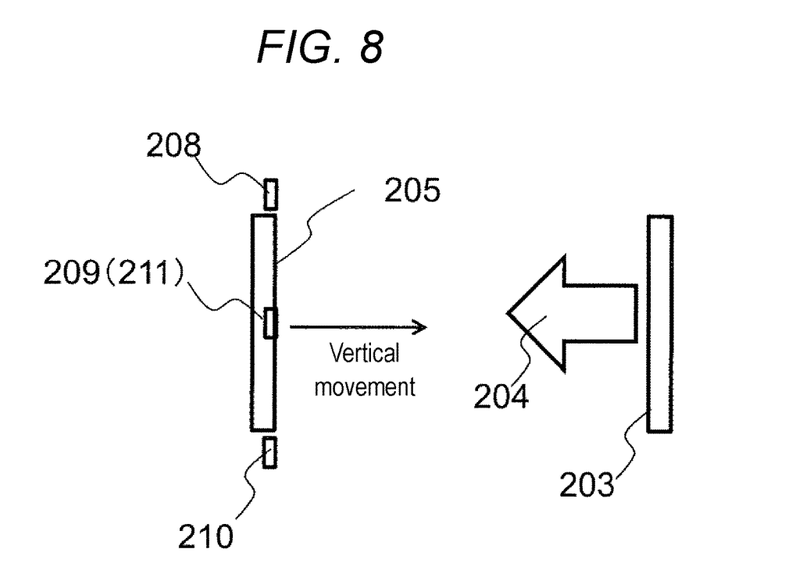
FIG. 8 is a diagram illustrating vertical movement adjustment on the power reception surface used in the wireless power supply method.

For example, FIG. 7 illustrates a case where adjustment antenna element 208 and adjustment antenna element 210 are used. The difference of electric power between amount of electric power P208 received in adjustment antenna element 208 and amount of electric power P210 received in adjustment antenna element 210 is calculated by calculator 505. An absolute value of the difference of the electric power calculated by calculator 505 is ΔP1. When it is determined by determinator 503 that ΔP1 is greater than the threshold and a value of amount of electric power P208 is greater than a value of amount of electric power P210, power reception antenna 205 is moved along axis 301 toward adjustment antenna element 208. Accordingly, the position of power reception antenna 205 is adjusted by movement mechanism 501 until determinator 503 determines that ΔP1 is included within a threshold. On the contrary, when it is determined by determinator 503 that a value of amount of electric power P208 is smaller than a value of amount of electric power P210, power reception antenna 205 is moved by movement mechanism 501 along axis 301 toward adjustment antenna element 210. Accordingly, the position of power reception antenna 205 is adjusted until ΔP1 is included within a threshold.

Similarly, in an operation along axis 302, the difference of the electric power between amount of electric power P209 received in adjustment antenna element 209 and amount of electric power P211 received in adjustment antenna element 211 is calculated by calculator 505. An absolute value of the difference of the electric power calculated by calculator 505 is ΔP2. When it is determined by determinator 503 that ΔP2 is greater than a threshold, and a value of amount of electric power P209 is greater than a value of amount of electric power P211, power reception antenna 205 is moved by movement mechanism 501 along axis 302 toward adjustment antenna element 209. Accordingly, the position of power reception antenna 205 is adjusted until ΔP2 is included within a threshold. On the contrary, when it is determined by determinator 503 that a value of amount of electric power P209 is smaller than a value of amount of electric power P211, power reception antenna 205 is moved by movement mechanism 501 along axis 302 toward adjustment antenna element 211. Accordingly, the position of power reception antenna 205 is adjusted by movement mechanism 501 until ΔP2 is included within a threshold.

In addition, an order of performing movement adjustment along axis 301 and movement adjustment along axis 302 may be arbitrary, both the movement adjustment may be in unison, or only one movement adjustment may be performed. In addition, the amounts of movement before the adjustment and after the adjustment are stored in storage 520 in step S2 of the movement adjustment.

Determinator 503 determines whether the rotation adjustment and the parallel movement adjustment are completed and processing is advanced to following third step S3 when first step S1 of the rotation adjustment and second step S2 of the parallel movement adjustment are completed (step S2A). Specifically, it will be described as follows.

The angle at which rotation is performed in first step S1 and which is stored in storage 520 is α1 and the amount of movement that occurs in second step S2 and is stored in storage 520 is Δ1. Determinator 503 determines that the rotation adjustment and the movement adjustment are completed in a case where determinator 503 determines that these α1 and Δ1 are smaller than a threshold, and there is no need to perform the rotation adjustment and the movement adjustment again.

On the contrary, determinator 503 determines that adjustment is necessary again in a case where determinator 503 determines that either one or both of α1 being greater than a threshold, and Δ1 being greater than the threshold are satisfied. In this case, once again, processing is returned to first step S1, and adjustment is repeated. Adjustment is repeated until determinator 503 determines that rotation and movement adjustments have completed, and processing is advanced to third step S3 after completing adjustment.

Next, as third step S3, adjustment for a vertical direction on the power reception surface of power reception antenna 205 is performed by vertical direction movement mechanism 504. A method thereof is illustrated in FIG. 8. Power reception antenna 205 is moved in a vertical direction with respect to the power reception surface of power reception antenna 205 so that amounts of electric power P208 and P210 of adjustment antenna elements 208 and 210 are matched with amount of electric power 404 in a state where adjustment is completed, as illustrated in FIG. 4. Actually, the difference between amount of electric power P208 and amount of electric power 404, and a difference between amount of electric power P210 and amount of electric power 404 are detected. Determinator 503 determines that adjustment in the vertical movement has completed in a case where determinator 503 determines that the difference of the electric power is included within a threshold with respect to the threshold considered that there is no difference of the electric power (step S3A). On the contrary, in a case where determinator 503 determines that either one or both of amounts of electric power P208 and P210 do not reach a threshold compared to amount of electric power 404, processing is returned to first step S1 and adjustment is performed again. In addition, in a case where determinator 503 determines that the difference of the electric power of amounts of electric power P208 and P210 in accordance with the movement becomes large and the movement adjustment in second step S2 has to be performed, processing is returned to first step S1 and adjustment is performed again. In addition, adjustment is performed by using amounts of electric power P208 and P210 of adjustment antenna elements 208 and 210. As a similar manner, the adjustment may be performed by using the amount of electric power P209 and P211 of adjustment antenna elements 209 and 211.

It is considered that rotation and position adjustments of power transmission antenna 203 and power reception antenna 205 are completed, when adjustment is completed up to third step S3 through first step S1 and second step S2. In addition, here, the rotation adjustment as first step S1 and the movement adjustment as second step S2 are performed. However, the movement adjustment as first step S1 and the rotation adjustment as second step S2 may be performed.

According to the method of the embodiment, it is possible to perform rotation and position adjustments and to realize high precision positioning by using the microwave beam.

Figure 9:
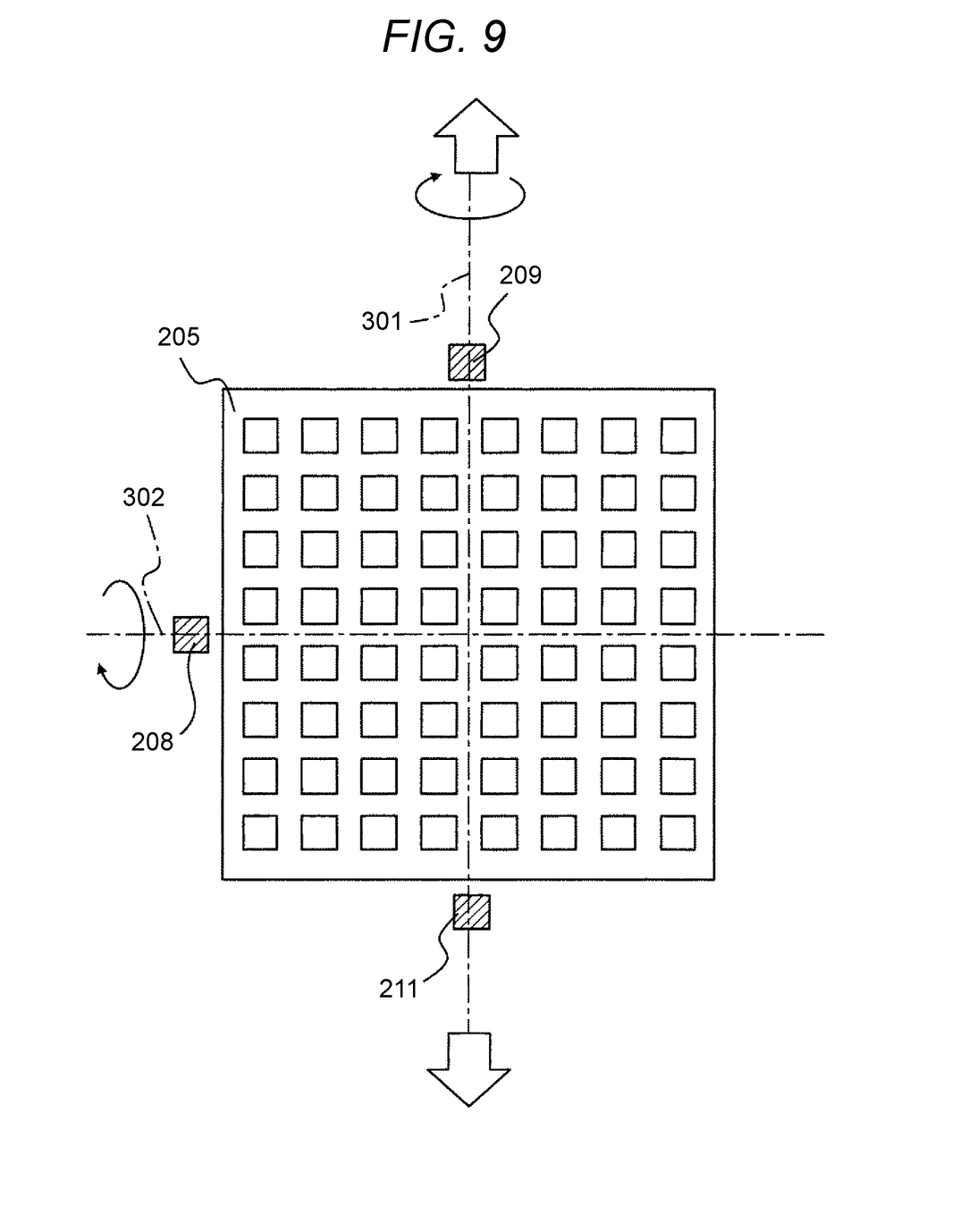
FIG. 9 is a diagram illustrating an arrangement of three adjustment antenna elements available in the wireless power supply method.

In addition, FIG. 2 illustrates an arrangement of adjustment antenna elements capable of performing the rotation adjustment around two axes and the movement adjustment in two directions. Meanwhile, it is possible to realize the rotation adjustment around two axes and the movement adjustment in only one direction by arranging three adjustment antenna elements 208, 209, and 211 as illustrated in FIG. 9. Adjustment antenna element 208 is arranged on axis 302 and adjustment antenna elements 209 and 211 are arranged at equal distances from the center of power reception antenna 205 on axis 301. By doing so, it is possible to perform the rotation adjustment with axis 301 and axis 302 as rotation axes and the parallel movement adjustment along axis 301.

Figure 10:
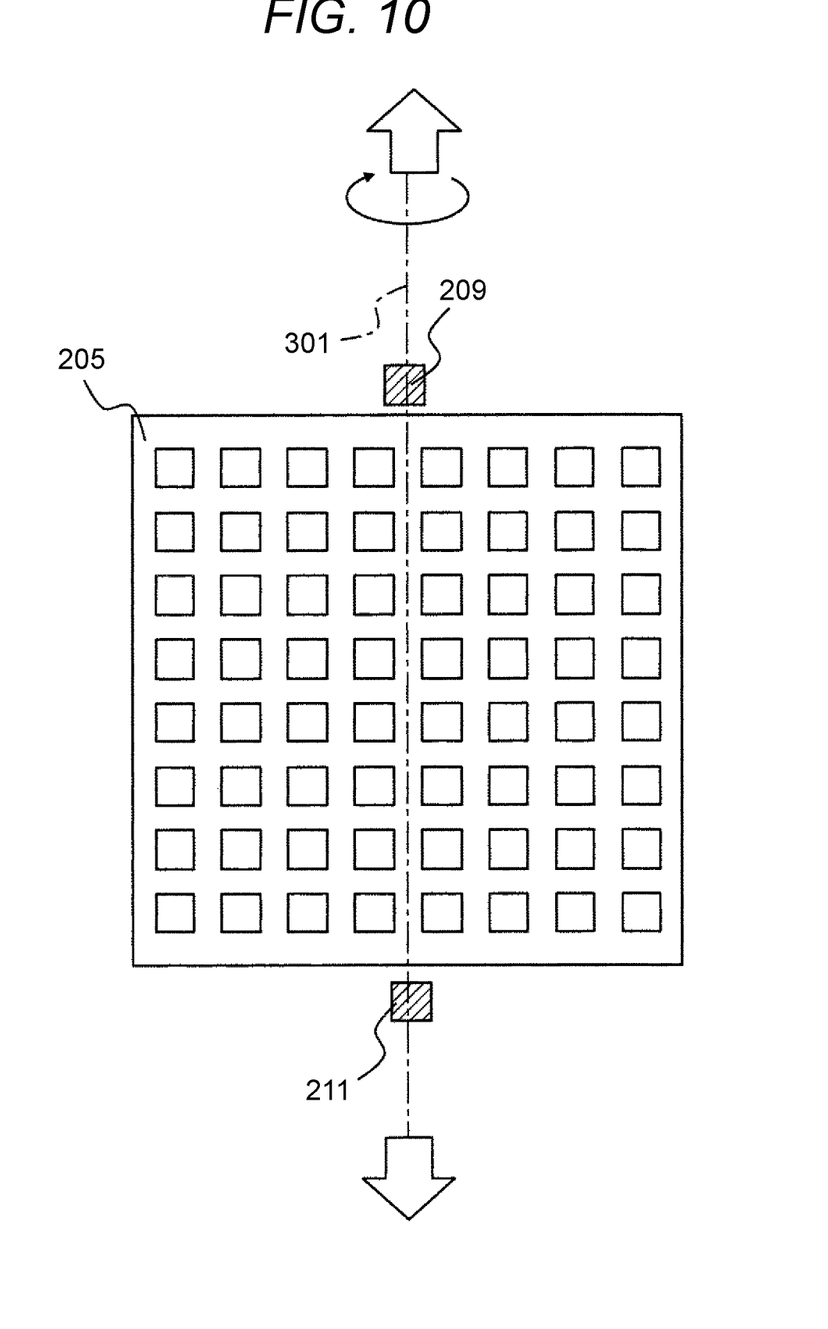
FIG. 10 is a diagram illustrating an arrangement of two adjustment antenna elements available in the wireless power supply method.

In addition, it is possible to realize the rotation adjustment on one axis and movement adjustment in only one direction by arranging two adjustment antenna elements 209 and 211 as illustrated in FIG. 10. It is possible to perform the rotation adjustment with axis 301 as a rotation axis and the parallel movement adjustment along axis 301 by arranging adjustment antenna elements 209 and 211 at equal distances from the center of power reception antenna on axis 301.

In addition, by performing the microwave transmission by weak, low electric power during position and rotation adjustments, the amount of electric power, which is leaked when microwaves are transmitted in a state where positional or rotational deviation occurs, is small, and it is possible to perform safe adjustment without over-consuming the electric power. Here, as an example in which the microwave transmission is performed by the weak, low electric power, a microwave beam transmitted from power transmission antenna 203 is switched to weak electromagnetic waves (for example, weak electromagnetic waves of 10 W or less per square meter for a transmission antenna area) by switching a microwave transmission passage. In this manner, it is possible to adjust the rotational deviation and the positional deviation between power transmission antenna 203 and power reception antenna 205.

According to the wireless power supply method of the embodiment, adjustment antenna elements 208, 209, 210, and 211 are provided in power reception antenna side for the rotation adjustment and the position adjustment between power transmission antenna 203 and power reception antenna 205. With this, it is possible to perform the rotation adjustment and the position adjustment according to amounts of power reception, that is, the amount of electric power of adjustment antenna elements 208, 209, 210, and 211. Therefore, it is possible to solve problems, such as efficiency degradation and electromagnetic wave leakage, due to the positional deviation. At the same time, it is possible to realize rotation adjustment and position adjustment of power transmission antenna 203 and power reception antenna 205 by using constituent elements of power transmission antenna 203 and power reception antenna 205, without using a separate dedicated system for the positioning of power supply target 207. Therefore, according to the embodiment, unlike the related art, a large and complex configuration become unnecessary other than basic functions of power transmission and power reception, thereby obtaining a practical configuration.

It is possible to achieve effects of each thereof by properly combining arbitrary embodiments or modification examples among various embodiments and modification examples described above. In addition, it is possible to make combinations of embodiments, combinations of examples or combinations of embodiments and examples, and it is also possible to make combinations between features of each of the different embodiments or examples.

The wireless power supply method of this disclosure is provided with adjustment antenna elements in power reception antenna side for the rotation adjustment and the position adjustment between the power transmission antenna and the power reception antenna, and performs adjustment based on the amount of power reception of adjustment antenna elements. With this, the embodiment is a wireless power supply method that can be used as a wireless power supply apparatus for a moving object of a power supply target as a highly accurate adjustment method using the microwave itself without requiring an additional special adjustment device.

What is claimed is:

1. A wireless power supply method for transmitting electric power by microwaves between a power transmission antenna and a power reception antenna configured by arranging a plurality of antenna elements on a plane, the wireless power supply method comprising:
   receiving a microwave beam that is radiated from the power transmission antenna by a plurality of adjustment antenna elements arranged at equal distances from a center of the power reception antenna on the same plane as the power reception antenna; and
   adjusting rotational deviation and positional deviation of the power transmission antenna and the power reception antenna based on an amount of electric power that is received in the plurality of adjustment antenna elements,
   providing on at least one rotation axis passing through the center of the power reception antenna on the same plane as the power reception antenna to the plurality of adjustment antenna elements when the plurality of adjustment antenna elements adjust the rotational deviation and the positional deviation of the power transmission antenna and the power reception antenna based on the amount of electric power received in the plurality of adjustment antenna elements,
   detecting the amount of electric power in the plurality of adjustment antenna elements provided on the rotation axis;
   performing a rotation adjustment for the power reception antenna up to an angle where a value of the detected amount of electric power is maximized;
   calculating a difference of the amount of electric power detected in the plurality of adjustment antenna elements provided on the rotation axis; and
   moving the power reception antenna along the rotation axis until the calculated difference is included within a threshold.

2. The wireless power supply method according to claim 1,
   wherein when the rotation axis comprises two ration axes orthogonal to each other at the center of the power reception antenna, and the plurality of adjustment antenna elements adjust the rotational deviation and the positional deviation of the power transmission antenna and the power reception antenna based on the amount of electric power received in the plurality of adjustment antenna elements, the plurality of adjustment antenna elements being provided on two locations that are equal distances from the center of the power reception antenna along the respective rotation axes, the amount of electric power is detected in the plurality of adjustment antenna elements provided on each of the two rotation axes, the rotation adjustment for the power reception antenna is performed up to the angle where the value of the detected amount of electric power is maximized, the differences of the amount of electric power detected in the plurality of adjustment antenna elements provided on at least one rotation axis of the two rotation axes are calculated, and the power reception antenna is moved along the one of the rotation axes until the calculated difference is included within a threshold.

3. A wireless power supply method for transmitting electric power by microwaves between a power transmission antenna and a power reception antenna configured by arranging a plurality of antenna elements on a plane, the wireless power supply method comprising:
- receiving a microwave beam that is radiated from the power transmission antenna by a plurality of adjustment antenna elements arranged at equal distances from a center of the power reception antenna on the same plane as the power reception antenna; and
- adjusting rotational deviation and positional deviation of the power transmission antenna and the power reception antenna based on an amount of electric power that is received in the plurality of adjustment antenna elements,
- wherein, in the adjusting, the rotational deviation and the positional deviation are adjusted by switching the microwave beam transmitted from the power transmission antenna to a weak electromagnetic wave, when adjusting the rotational deviation and the positional deviation of the power transmission antenna and the power reception antenna.

* * * * *